United States Patent
Brouwer

[11] 3,712,754
[45] Jan. 23, 1973

[54] DOSING DEVICE

[75] Inventor: Geert Brouwer, Eindhoven, Netherlands

[73] Assignee: U.S. Philips Corporation, New York, N.Y.

[22] Filed: Dec. 3, 1970

[21] Appl. No.: 94,872

[30] Foreign Application Priority Data

Dec. 5, 1969 Netherlands .......................6918300

[52] U.S. Cl. .....................................................415/90
[51] Int. Cl. ....................................................F01d 1/36
[58] Field of Search.............................222/410–413; 415/76, 90; 198/213; 239/393, 394

[56] References Cited

UNITED STATES PATENTS

| | | | |
|---|---|---|---|
| 3,383,015 | 5/1968 | Miler | 222/413 X |
| 1,869,106 | 7/1932 | Marchant | 415/76 X |
| 2,730,297 | 1/1956 | Van Dorsten et al. | 415/90 X |
| 779,900 | 1/1905 | Bartlett | 415/76 X |

FOREIGN PATENTS OR APPLICATIONS

| | | | |
|---|---|---|---|
| 186,735 | 10/1922 | Great Britain | 239/393 |
| 1,036,306 | 4/1953 | France | 239/393 |
| 5,219 | 3/1905 | Great Britain | 415/76 |

Primary Examiner—Samuel F. Coleman
Assistant Examiner—Norman L. Stack, Jr.
Attorney—Frank R. Trifari

[57] ABSTRACT

A dosing device for the pulse-free and continuous supply of very small quantities of medium per unit of time. A cylindrical rotor which can be coupled to a drive has a rotor capable of rotating with a very small amount of play in a cylinder surrounding it; the rotor or cylinder is provided with one or more shallow pumping grooves, each of which is situated in a plane transverse to the rotor axis. Each of said pumping grooves is interrupted in at least one place on the rotor circumference by a dam, the cylindrical outer surface of which coincides with the cylindrical surface of the rotor cylinder. A medium supply duct terminates on the one side of each dam in the relevant groove, and a medium discharge duct communicates with the relevant groove on the other side.

10 Claims, 4 Drawing Figures

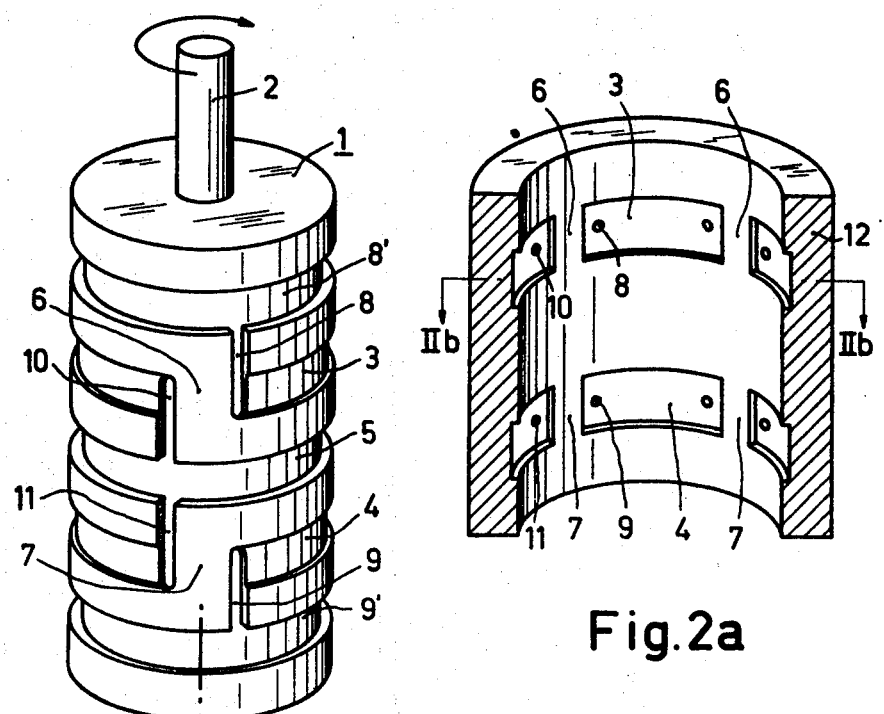
Fig.2a
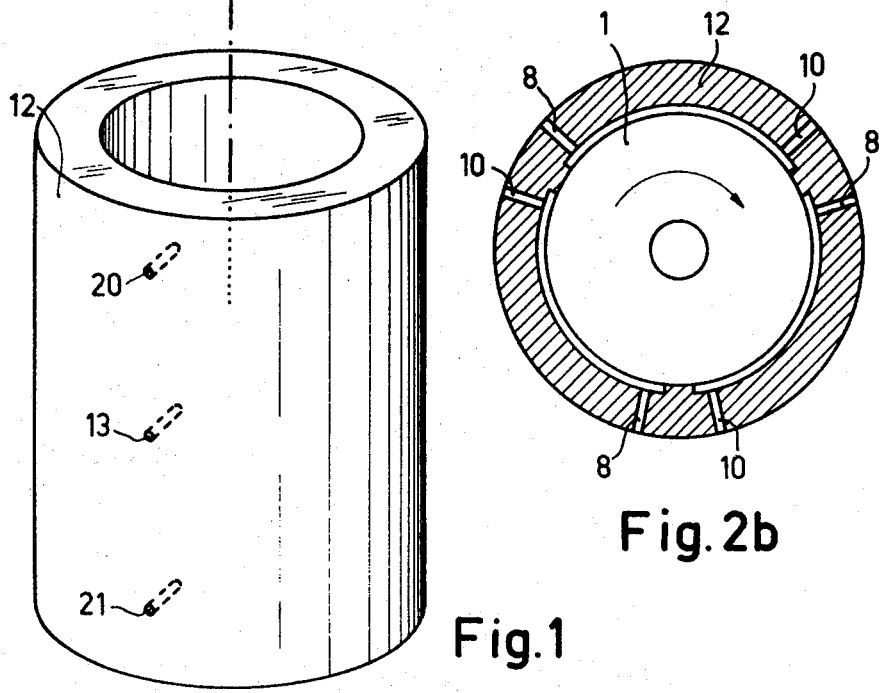
Fig.2b
Fig.1
INVENTOR.
GEERT BROUWER

DOSING DEVICE

The invention relates to a device for the pulse free and continuous supply of very small quantities of medium per unit of time: Devices of the kind to which the invention relates are applied, for example, in the chemical analysis technique where quantities in the order of magnitude of some ccm/sec or less have to be dosed in a continuous and pulse-free flow. Furthermore, it is often desired for the space inside the device, that is to say the quantity of medium inside the device, to be small.

Known dosing devices of the aforementioned kind are the so-called hose pumps, which have the disadvantage that they are comparatively large and bulky, that they also have much space inside the pump which is completely filled with liquid, and further that the quantity supplied per unit of time changes in due course because the diameter of the hose changes.

The invention has for its object to provide a device not having the aforementioned disadvantages. The dosing device according to the invention is characterized in that the device comprises a cylindrical rotor which can be coupled to a drive, the rotor being capable of rotating with a very small amount of play in a cylinder surrounding it. The rotor or cylinder is provided with one or more shallow pumping grooves, each of which is situated in a plane transverse to the axis. Each of said pumping grooves is interrupted in at least one place on the circumference by a dam, the cylindrical outer surface of which coincides with the cylindrical surface of the rotor or cylinder, whilst on the one side of each dam a medium supply duct terminates in the relevant groove, a medium discharge duct communicating with the relevant groove, on the other side.

Upon rotation of the rotor in the cylinder, the medium in the shallow pumping grooves is carried along by viscous forces and is pumped from the place where the supply ducts communicate with the pumping grooves to the place where the discharge ducts are connected. From there the medium can be fed further. In this way a dosing device is obtained, with very little dead volume, whilst, since both the internal leak and the flow in the discharge ducts are inversely proportional to the viscosity of the medium, the supplied quantity per unit of time is directly proportional to the number of revolutions of the rotor and is independent of the viscosity. The pressure under which the device supplies the liquid may easily be some tens of atmospheres, whilst also after prolonged operation no changes in the supplied flow occur. In this way an extremely simple, sparingly voluminous and very reliable dosing device is obtained.

In order to obtain an optimally balanced distribution of forces on the rotor, each of the pumping grooves in a further embodiment of the dosing device according to the invention is provided with at least three dams uniformly spaced along the circumference with a supply and a discharge duct on both sides of each of them.

In a further advantageous embodiment the pumping grooves are situated in the rotor surface, while the medium supply and discharge ducts are constructed as comparatively deep axial grooves which at one end communicate the relevant pumping groove and with a medium supply duct, and at the other end communicates the pumping groove with a comparatively deep medium discharge duct which extends across the entire circumference of the rotor in a plane transverse to the rotor axis; the cylinder is provided with a further medium discharge duct communicating with the first-mentioned discharge duct.

According to a further embodiment a further housing is fitted around the cylinder, this housing being provided with a duct communicating with the discharge duct in the cylinder. This further housing is pivotable with respect to the cylinder in order to vary the resistance of the discharge.

The invention will be further explained with reference to the drawing in which in three embodiments of dosing devices are shown.

BRIEF DESCRIPTION OF THE DRAWINGS

FIG. 1 is an exploded perspective view of one rotor-cylinder embodiment of the invention, FIG. 2a is a partial perspective view in section of another cylinder embodiment, FIG. 2b is a sectional plan view of the cylinder of FIG. 2a, FIG. 3 is a sectional front elevation view of the device.

DESCRIPTION OF THE PREFERRED EMBODIMENT

Figure 3:
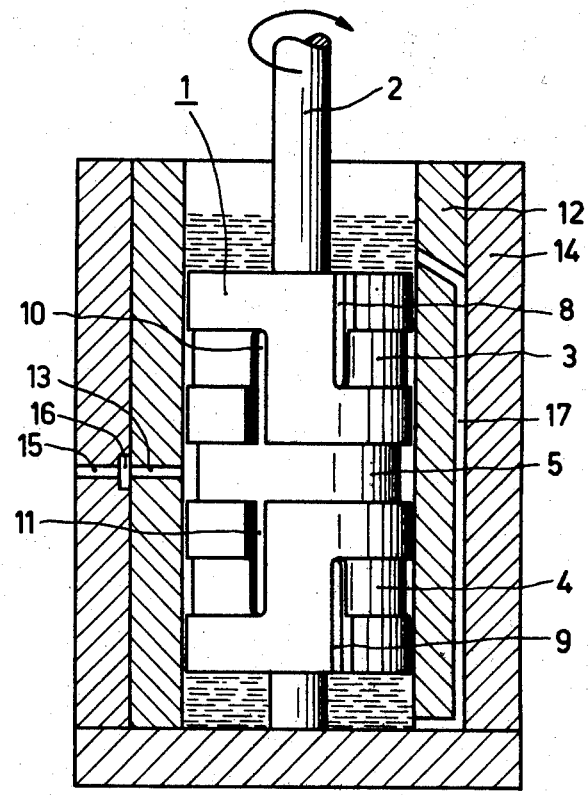

In FIG. 1 reference numeral 1 denotes a rotor provided with a shaft 2, which may be coupled to a driving system not shown. Instead of coupling the rotor to a drive by means of shaft, a magnetic coupling may also be applied so that the device may be hermetically sealed which may be advantageous, for example, for dosing radio-active material. The rotor is provided with two shallow pumping grooves 3 and 4. The depth of these grooves is, for example 40 $\mu$m. The rotor furthermore comprises a considerably deeper discharge duct 5 which is circular and circumscribes the rotor and, whose depth is, for example, 0.5 mm. The grooves 3 and 4 are each provided with a dam or interface to seal or prevent fluid flow 6 and 7 respectively, while on the one side of these dams the rotor is provided with axial or secondary supply grooves 8 and 9, respectively, communicating the relevant grooves 3 and 4 with liquid supply ducts or main supply grooves 8' and 9'. On the other side of said dams, the rotor is provided with a axial or secondary discharge grooves 10 and 11, respectively communicating the grooves 3 and 4 with the discharge duct or main discharge groove 5. The rotor fits with a very small amount of play of some $\mu$m in the cylinder or housing (the rotor outer surface is closely adjacent the cylinder's inner surface) 12 which is furthermore provided with a discharge duct or aperture 13 communicating with duct 5, and supply ducts or aperture 20 and 21, communicating with the duct 8' and 9'.

Upon rotation of the rotor 1 in the direction indicated by an arrow, the liquid in the grooves 3 and 4 is forced by viscous forces in the direction of the axial discharge grooves 10 and 11, the liquid being drawn from ducts 8' and 9' via the axial supply grooves 8 and 9. The liquid is thus pumped through the grooves 3 and 4 from supply grooves 8 and 9 to the duct 5 from where it flows off through discharge duct 13. From the duct 5, some leakage occurs to the grooves 3 and 4, which leakage is, of course, dependent upon the viscosity of the liquid. Furthermore, the resistance to flow through duct 13 depends on the viscosity in the same way as the leakage. This means that the total liquid flow supplied will be independent of the viscosity and directly proportional to the number of revolutions.

Even though the foregoing dealt with liquids to be dosed, the relevant device is equally suitable for gaseous media while maintaining all of its advantages.

In the device shown, each pumping groove is provided with only one dam. In order to achieve an equilibrium of forces on the rotor, it is advantageous to provide each groove with three or more dams uniformly spaced along the circumference.

FIGS. 2a and 2b show schematically in two sections how the grooves may be incorporated in the cylinder wall instead of on the rotor. The grooves are denoted by the same reference numerals as used in FIG. 1. A difference is that now each of the grooves 3 and 4, as shown in FIG. 2b, is provided with three dams 6 and 7, respectively, uniformly spaced along the circumference. The liquid supply ducts 8 and 9 and liquid discharge ducts 10 and 11, respectively, are then incorporated in the cylinder as radially extending ducts. On the outer surface of the cylinder said ducts may communicate with further liquid supply and discharge ducts.

FIGS. 3 diagrammatically shows a dosing device which is generally in accordance with that of FIG. 1, but around cylinder 12 there is a rotatable housing or outer sleeve 14, which is provided with a further discharge duct or aperture 15, which communicates, via a gap 16, with discharge duct 13. By turning housing 14 the resistance to flow between the ducts or apertures 13 and 15 can then be adjusted by varying the alignment of their flow paths. In order to have liquid also below the rotor, its top is connected to its bottom via a duct 17.

What is claimed is:

1. A dosing device operable with a source of fluid medium for providing a pulse-free and continuous supply of fluid medium, comprising a cylindrical housing, a cylindrical rotor rotatable within the housing, the housing and rotor having respectively inner and outer surfaces that are closely adjacent and form a fluid seal except for flow paths between said surfaces, each path being formed as a groove in at least one of said surfaces, said paths including a circular discharge groove defining a plane transverse to the rotor axis, a similar circular supply groove axially spaced from said discharge groove, intermediate and axially spaced from each of said discharge and supply grooves, a similar but shallower in depth pumping groove defining an incomplete circle having two ends, an axial supply groove communicating the circular supply groove with one end of said pumping groove, an axial discharge groove communicating said circular discharge groove with the other end of the pumping groove, the housing having supply and discharge apertures extending through the wall thereof and positioned to communicate respectively with the circular supply and discharge grooves, whereby fluid from said source entering said supply aperture is discharged at a selected rate through said discharge aperture.

2. A dosing device operable with a source of fluid for providing a pulse-free and continuous supply of fluid, comprising a cylindrical housing, a cylindrical rotor rotatable within the housing, the housing and rotor having respectively inner and outer surfaces that are closely adjacent and form a fluid seal interface except for flow paths between said surfaces, each path being formed as a groove in at least one of said surfaces, said paths including a continuous main discharge groove circumscribing said interface, a similar main supply groove axially spaced from said main discharge groove, intermediate and axially spaced from each of said main discharge and supply grooves, a non-continuous pumping groove having two ends, an axial supply groove communicating said main supply groove with one end of said pumping groove, an axial discharge groove communicating said main discharge groove with the other end of the pumping groove, the housing having supply and discharge apertures extending through the wall thereof and positioned to communicate respectively with the main supply and discharge grooves, whereby fluid from said source entering said supply aperture is discharged at a selected rate through said discharge aperture.

3. A dosing device operable with a source of fluid for providing a pulse-free and continuous supply of fluid, comprising a cylindrical housing, a cylindrical rotor rotatable within the housing, the housing and rotor having respectively inner and outer surfaces that are closely adjacent and form a fluid seal interface except for flow paths between said surfaces, each path being formed as a groove in at least one of said surfaces, said paths including a continuous main discharge groove circumscribing said interface, a similar main supply groove axially spaced from said main discharge groove, intermediate and axially spaced from each of said main discharge and supply grooves a non-continuous pumping groove having two ends, a secondary supply groove communicating said main supply groove with one end of said pumping groove, a secondary discharge groove communicating said main discharge groove with the other end of the pumping groove, the housing having supply and discharge apertures extending through the wall thereof and positioned to communicate respectively with the main supply and discharge grooves, whereby fluid from said source entering said supply aperture is discharged at a selected rate through said discharge aperture.

4. Apparatus according to claim 1 wherein said grooves are formed only in the rotor outer surface.

5. Apparatus according to claim 1 wherein said grooves are formed only in the housing inner surface.

6. Apparatus according to claim 1 wherein each pumping groove is shallow having depth in the radial direction of less than 100 $\mu$m., and said supply and discharge grooves are comparatively deep relative to said pumping groove.

7. Apparatus according to claim 1 wherein the portion of said housing and rotor surfaces defining said non-continuous pumping groove comprise at least three equally spaced circular sections.

8. Apparatus according to claim 1 further comprising a cylindrical outer sleeve having a second discharge aperture extending through a wall thereof, this sleeve circumscribing said housing and positioned such that their discharge apertures correspond, the sleeve being rotatable relative to said housing for varying the alignment of the flow paths of said discharge apertures.

9. Apparatus according to claim 1 wherein said pumping grooves have depth extending radially of approximately 40 μm and said supply and discharges grooves have depth of approximately 0.5 mm.

10. Apparatus according to claim 2 wherein there is a second separate and similar supply aperture in the housing, and in said rotor, second main and secondary supply ducts, pumping groove, and secondary discharge groove, the latter of which feeds into said main discharge groove with said two main supply grooves being axially remote, whereby equilibrium may be established by equal and opposite forces on said rotor.

* * * * *